UNITED STATES PATENT OFFICE.

ALFRED CHARLES BUENSOD, OF NEW YORK, N. Y.

METHOD OF CURING AND TREATING TOBACCO.

1,339,375.　　　　　Specification of Letters Patent.　　Patented May 4, 1920.

No Drawing.　　　Application filed March 14, 1917.　Serial No. 154,842.

*To all whom it may concern:*

Be it known that I, ALFRED CHARLES BUENSOD, a citizen of the United States of America, residing in the city, county, and State of New York, have invented a new and useful Method of Curing and Treating Tobacco, of which the following is a full, clear, and exact description.

As is well known to those skilled in the art, it is common practice in treating tobacco, after it has been harvested, to hang it in curing barns, which vary greatly in size and type. The smaller barns, which are made from 15' to 20' long and 10' to 20' wide, are mostly constructed from logs and are arranged for the use of high temperatures, suitable openings being provided for ventilation. The larger barns, usually of frame construction, range in size from 120' to 200' long and 32' to 40' wide, are used mostly for natural air curing and are provided with a large number of ventilators. In many cases open fires or flues are used in these barns to give a limited amount of heat. The ventilating openings admit a good deal of daylight to the interior of the barn, which is very undesirable.

The purpose of this curing treatment is that certain chemical changes in the composition of the leaf may take place to develop the desired color; regulate the temperature retaining capacity; control the texture, fire holding capacity and elasticity; and produce the proper keeping qualities, so that the tobacco will not decay before being further treated.

It is well known that all tobacco is subjected to after treatment for the purpose of developing certain properties, such as aroma, flavor, etc. Although it is possible to make this after treatment a continuation of the curing process, all the changes in the tobacco described herein are those which relate to the curing process.

The curing of tobacco comprises essentially the creation of such chemical changes in certain compositions of the leaf which shall produce the lemon yellow, the orange, the brown, the greenish brown, or the dark brown color desired in various types of tobacco, together with the other properties. Chemically, the changes can be divided into two parts: first, the period in which the changes take place while the leaf is still alive and in which the green color is chemically changed to yellow; second, the period following the death of the cells, consisting mostly in oxidation of the various constituents of the leaf and producing the characteristic color of the tobacco.

The green tobacco leaf, after being harvested, always contains certain enzyms which take an active part in the changes throughout the process, and, in the period of cell starvation, they are greatly increased. The formation of the color of the tobacco is entirely due to the oxidation of the cell substance through the medium of an enzym. This oxidizing action may take place at any time, either before or after the leaf has turned yellow.

When the green leaf is hung in an absolutely dark chamber, the action of the rays of light and the moisture supply through the root system being cut off, a period of starvation sets in, and the reserve supply of food stored in the leaf is consumed. It is necessary that tobacco be cured in the absence of the direct or the indirect rays of sunlight in order to extend the starving process. This is so because plant life is dependent upon a food supply, a water supply, and the agencies of the rays of sunlight for its development, and in curing, we deprive the plant of its source of water and its food supply and must also deprive it of the agencies of light. If light is present, although the food and water supply has been terminated, the rays of light acting upon the tobacco might cause a further growth of the tobacco by utilizing the water supply of the leaves and the food stored up therein. With the aid of the enzyms the starch content of the leaf is dissolved and the sugar which is formed is partly oxidized by an increased respiration. To obtain the yellow color, it is necessary to slowly starve the leaf and allow sufficient time for the starch to be dissolved, thereby causing the natural death of the cells. If the moisture contained in the leaf is removed too rapidly, or if the leaf is subjected to unfavorable temperatures or poisons, the cells would be prematurely killed before the starch could be dissolved and the green color would thereby be set in the leaf. If the coloring enzyms were still alive, they would act on the cell substance and produce colors showing over the green color of the leaf. It is desirable sometimes to hasten the starvation at the end of this period of the process, in order to set some green color in the leaf to produce a type of leaf having a greenish cast. The coloring enzyms act upon the cell substance and produce various final colors in the leaf depending upon the duration of the action, the amount of enzyms present, and the amount of moisture still retained by the cells, which moisture acts as a carrier.

Enzyms are destroyed by various influences among the most prominent being high temperatures, protoplasmic poisons or a surplus of moisture in the leaf, which, if maintained for a period of time, causes, in the latter case, self-oxidation of the enzym. The color producing enzyms, if not prematurely destroyed, mix with the soluble and oxidizable substance contained in the cell sap when the cells are killed, and can no longer hold the liquid contained therein.

In some types of tobacco a lemon yellow is desired, which requires the killing of the enzyms directly after the yellow is developed. This is effected by rapidly drying out the leaf at a temperature high enough to kill the enzyms. In this type of tobacco the presence of the coloring enzyms is not essential to the further treatment of the tobacco. In other types of tobacco, particularly that which is used for cigars, enzyms are required for further treatment of the leaf and hence the temperatures used in the curing must not be high enough to kill them.
In some of these types of tobacco, a light color is desired and therefore the curing must be conducted in such a manner as to avoid darkening. The temperature necessary to effect the desired change will vary according to the types of tobacco being treated; for example, cigar wrapper type, cigar filler type, and bright tobacco type. In some types it is necessary to kill the enzyms, but in other types they should not be killed. In none of the types should there be applied a temperature high enough to scorch the tobacco or to evaporate the essention oils contained therein; in either of which cases, the tobacco would be permanently injured. The highest temperature to be used in one type of tobacco might be 110° F., while in another type a temperature of 200° F. or over might be desirable. For convenience in this specification and claims, I have referred to the desirable or necessary temperature as the "optimum temperature", or a temperature not higher than the highest temperature that the type of tobacco being treated will stand without damage. The characteristics desired and the time when the maximum allowable or optimum temperature is reached can be easily detected by those familiar with the curing and treatment of tobacco.
After the tobacco has been thoroughly cured in the lamina, stems, and stalks (if cured on the stalk), the moisture content must be increased a proper amount, usually to from 20% to 25%, to allow the tobacco to be handled without breakage or for the purpose of further treatment. In some types of tobacco, it is only necessary that sufficient moisture be supplied to avoid breakage, but cigar tobacco must contain about 25% of moisture in order that further treatment may be properly carried on.

The intensity of the chemical actions and the time necessary for a thorough cure, during the curing process are dependent upon the temperature used. The excess moisture of the leaf is liberated and must be carried away as the leaf is gradually starved and changes in color.

The principal object of my invention has been to provide a continuous method of treating tobacco, which shall be carried on in darkness, and under conditions which may be absolutely governed, with respect to temperature and relative humidity, so that, not only the chemical changes going on in the leaf may be easily controlled, but the temperature and relative humidity may be varied to suit these changes, thereby producing the desired properties in the leaf.

In carrying my invention into effect, the green leaves, after being harvested, are suspended in any well known manner within a suitable curing apparatus, and subjected to the passage of continuously circulating air currents of a certain predetermined temperature and relative humidity. The temperature of the air is then raised and its percentage of relative humidity lowered until the tobacco has the desired characteristics, whereupon the temperature of the air is lowered and its percentage of humidity raised, thus supplying sufficient moisture to avoid breakage and for further treatment.

In practice, I prefer to use air at a temperature of 70° to 90° F. and at a relative humidity of from 78% to 82%. The method is carried on under these conditions for a length of time sufficient to consume the surplus food contained in the leaf and cause the death of the cells. The temperature of the treating air is then gradually raised to the optimum temperature of the tobacco being treated, and the relative humidity is gradually lowered to about 65%. These conditions are maintained until all parts of the tobacco are fully cured. Before the tobacco is removed from the apparatus it is subjected to air currents having a temperature of from 70° to 85° F. and a relative humidity of from 80% to 85% for the purpose of replacing the amount of moisture in the leaves necessary for its removal for storage or further treatment.

The limits of temperature and relative humidity are controlled by the type of tobacco being treated, the stage of maturity in which it is harvested, and the requirements of the finished tobacco.

The above method may be modified slightly by starting with a temperature of from 70° to 80° F. and a relative humidity of 82% and gradually increasing the temperature and lowering the humidity, so that, when the yellow color is reached, the temperature will be between 90° and 100° F. and the humidity about 78%. The temperature will be continuously raised and the humidity will be continuously lowered, until the curing is completed, at which time the temperature would be just under the optimum temperature for the type of tobacco being treated and the humidity would have reached a point between 65% and 70%. Then for the second part of the treatment, the temperature would be lowered to from 75° to 85° F. and the humidity increased to from 80% to 85% for raising the moisture content to the necessary point. The last mentioned method is particularly adapted for tobacco which is used for cigar wrappers.

Having thus described my invention, what I claim is:

1. A method of curing and treating tobacco which consists in subjecting it to air currents having a temperature of from 70° to 90° F. and a relative humidity of from 78% to 82% for a sufficient length of time to consume the surplus food contained in the leaf and cause the death of the cells, then gradually raising the temperature of the air currents to a degree not higher than the highest degree that the type of tobacco being treated will stand without damage, and gradually lowering the relative humidity of the air currents to about 65%, until all parts of the tobacco are fully cured, and then gradually reducing the temperature of the air currents to about 70° to 85° F. and gradually increasing the relative humidity thereof to from 80% to 85%, for raising the moisture content to the necessary point.

2. A method of curing tobacco which consists in subjecting it in darkness to air currents having a temperature of from 70° to 90° F. and a relative humidity of from 78% to 82% for a sufficient length of time to consume the surplus food contained in the leaf and cause the death of the cells, then gradually raising the temperature of the air currents to a degree not higher than the highest degree that the type of tobacco being treated will stand without damage, and gradually lowering the relative humidity of the air currents to about 65%, until all parts of the tobacco are fully cured.

3. A method of curing tobacco which consists in subjecting it to air currents having a temperature of from 70° to 80° F. and a relative humidity of 82% for a sufficient length of time to consume the surplus food contained in the leaf and cause the death of the cells, then gradually raising the temperature of the air currents to from 90° to 100° F. and gradually lowering the relative humidity of the air currents to 78%, and then continuously raising the temperature of the air currents to a degree not higher than the highest degree that the type of tobacco being treated will stand without damage, and continuously lowering the relative humidity of the air currents to from 65% to 70%, until all parts of the tobacco have been fully cured.

4. A method of curing and treating tobacco which consists in subjecting it to air currents having a temperature of from 70° to 80° F. and a relative humidity of 82% for a sufficient length of time to consume the surplus food contained in the leaf and cause the death of the cells, then gradually raising the temperature of the air currents to from 90° to 100° F. and gradually lowering the relative humidity of the air currents to 78%, then continuously raising the temperature of the air currents to a degree not higher than the highest degree that the type of tobacco being treated will stand without damage, and continuously lowering the relative humidity of the air currents to from 65% to 70%, until all parts of the tobacco have been fully cured, and then gradually reducing the temperature of the air currents to from 75° to 85° F. and gradually increasing the relative humidity thereof to from 80% to 85% for raising the moisture content to the necessary point.

5. A method of curing tobacco which consists in subjecting it in darkness to air currents having a temperature of from 70° to 80° F. and a relative humidity of 82% for a sufficient length of time to consume the surplus food contained in the leaf and cause the death of the cells, then gradually raising the temperature of the air currents to from 90° to 100° F. and gradually lowering the relative humidity of the air currents to 78%, and then continuously raising the temperature of the air currents to a degree not higher than the highest degree that the type of tobacco being treated will stand without damage, and continuously lowering the relative humidity of the air currents to from 65% to 70%, until all parts of the tobacco have been fully cured.

In testimony whereof I have hereunto signed my name.

ALFRED CHARLES BUENSOD.